UNITED STATES PATENT OFFICE.

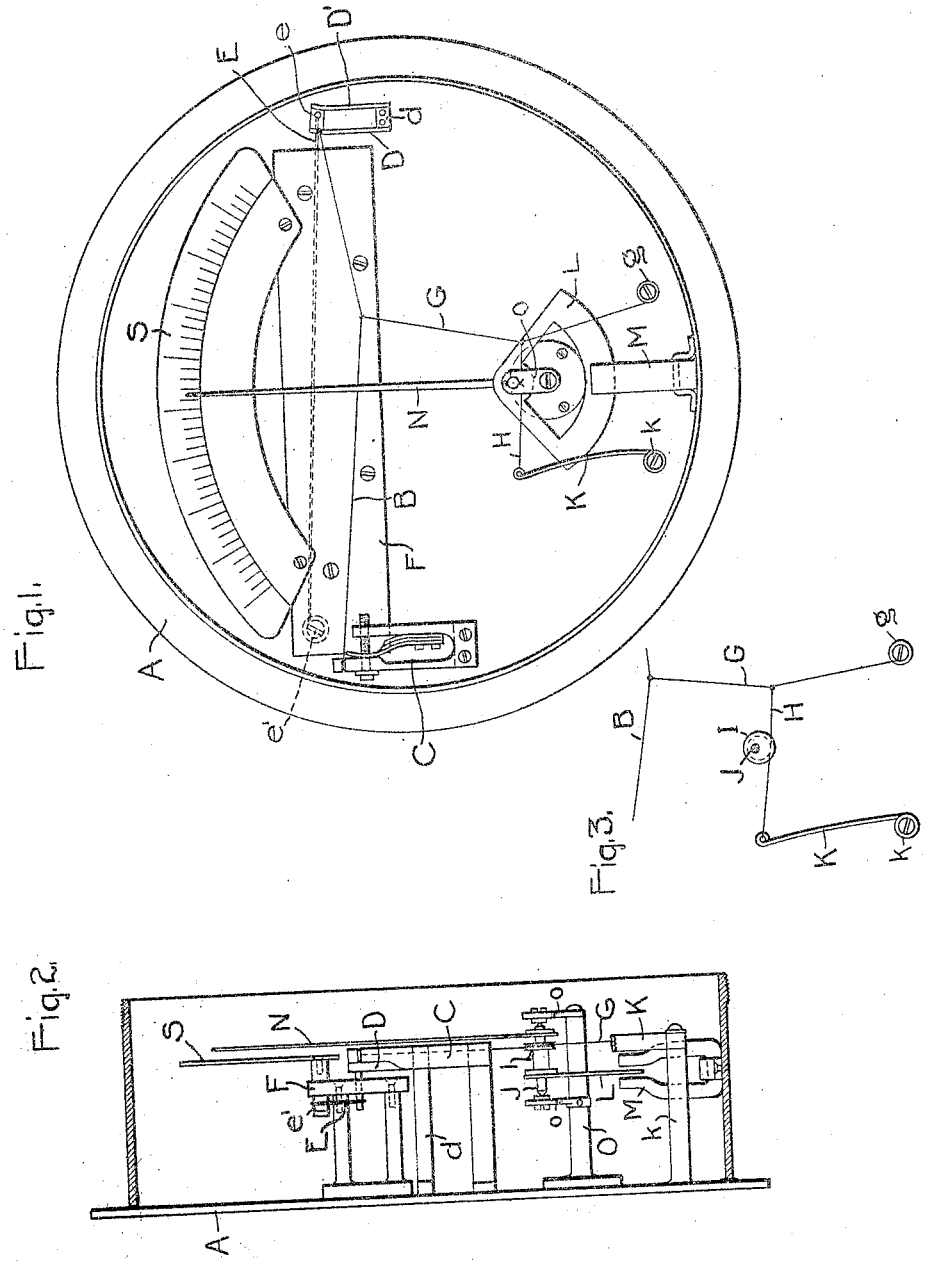

WESLEY E. LAIRD, OF PITTSFIELD, MASSACHUSETTS, ASSIGNOR TO STANLEY ELECTRIC MANUFACTURING COMPANY, OF PITTSFIELD, MASSACHUSETTS, A CORPORATION OF NEW JERSEY.

ELECTRICAL MEASURING INSTRUMENT.

No. 820,978.     Specification of Letters Patent.     Patented May 22, 1906.

Application filed October 12, 1904. Serial No. 228,140.

*To all whom it may concern:*

Be it known that I, WESLEY E. LAIRD, a citizen of the United States, residing at Pittsfield, in the county of Berkshire and State of Massachusetts, have invented certain new and useful Improvements in Electrical Measuring Instruments, of which the following is a specification.

My invention relates to electrical measuring instruments of the well-known hot-wire type, and is particularly applicable to the form of instrument disclosed in Patent No. 537,343, issued to Hartmann and Braun April 9, 1895, though it is not limited thereto.

In measuring instruments which depend upon the expansion of a wire traversed by an electric current for measuring the amount of the current it is well understood that some provision must be made for guarding against variations in the indications given by the instrument due to variations in atmospheric temperature. One method of guarding against this source of error that has been suggested heretofore consists in attaching the hot wire to a yielding abutment, such as a spring, which is supported in place by a compensating wire of the same material as the hot wire, so that variations in the temperature of the surrounding air produce proportional variations in the length of the hot wire and compensating wire and the movement of the yielding abutment compensates for the expansion of the hot wire. In order that this compensation should be exact, it is necessary that the movement of the yielding abutment through a given distance should correspond to equal or proportional expansions of the hot wire and compensating wire. Thus if the two wires are of approximately equal length and approximately parallel to each other the abutment should move in a direction substantially parallel to both wires.

One feature of my invention consists in providing a novel and compact form of yielding abutment for this purpose which has a movement under variation of atmospheric temperature more nearly parallel to the wires than can be obtained with the single leaf-spring frequently employed.

In many instruments of the hot-wire type as heretofore built a source of error has existed in the influence of the hot wire upon the compensating wire. Obviously if the heat produced in the hot wire by the passage of the current to be measured is transmitted to the compensating wire, so as to result in an expansion of the compensating wire also, the indication given by the instrument will be too low.

One feature of my invention consists in eliminating this source of error by placing between the two wires a substantial heat-guard which completely shields the compensating wire from the hot wire. This heat-guard is preferably of heat-absorbing and heat-conducting material, such as metal, so that the heat from the hot wire is absorbed and radiated into the surrounding air or conducted through the supports of the heat-guard to the casing.

In measuring instruments of all types it is sometimes desirable to obtain a variation in the length of different parts of the scale corresponding to the electrical units to be measured. Sometimes it is desirable to obtain a perfectly even scale, so that a given movement of the needle corresponds to a given variation in the electrical quantities to be measured, regardless of the position of the needle on the scale. In other cases it is desirable that the reading over a portion of the range of the instrument should be very accurate, while the rest of the range is comparatively unimportant. In such a case the desired result may be obtained by relatively increasing the movement of the needle for a given variation in the current to be measured at that part of the instrument's range where the greatest accuracy of reading is desired.

One feature of my invention consists in providing instruments, in which the expansion of the hot wire is transmitted to the indicating means by a cord or thread which passes around a pulley, with a pulley not round, as is the usual construction, but shaped to give any desired angular movement of the pulley for a given longitudinal movement of the thread passing around it. By this means the length of the units of the several portions of the scale may be varied as desired.

My invention will best be understood by reference to the accompanying drawings, in which—

Figure 1 shows a front elevation of an instrument arranged in accordance with my invention. Fig. 2 shows a side elevation, partly in cross-section, of the same; and Fig. 3 shows a detail of the pulley.

In the drawings, A represents the back of the instrument-casing upon which all the movable parts of the instrument are supported.

B represents the hot wire, which is attached at one end to the adjustable support C and at the other end to the yielding abutment formed by the two parallel leaf-springs D D'. These two flat parallel springs are supported at their lower ends on the post $d$ and are rigidly connected at their upper ends, as shown in Fig. 2. To their upper ends is attached the hot wire B, and to a pin $e$, carried at their upper ends, is also attached the compensating wire E, the other end of which is secured to the post $e'$. This construction with two parallel springs connected at both ends gives a movement through the range of temperature to which the instrument is likely to be subjected which much more closely approximates a straight line parallel to the wires themselves than could be obtained by the use of a single spring of the same length, since with a single spring the bending occurs chiefly near the free end, which causes the end to move substantially in the arc of a circle having a radius much less than the length of the spring, while with two springs rigidly connected at both ends a compound bend occurs near their middle, which is equivalent to a movement on an arc of greater radius.

In order to prevent radiation from the hot wire to the compensating wire, the heat-guard F is interposed between the two. This heat-guard, which, as has been said before, is preferably of heat-absorbing and heat-conducting material, effectually screens the compensating wire from the hot wire and prevents errors in the readings due to the influence of the hot wire upon the compensating wire.

The expansion of the hot wire B is transmitted to the indicating-needle N by the cord G, one end of which is attached to a point on the hot wire and the other end of which is supported by the post $g$, and by the cord $h$, which is attached to the cord G, passes round a pulley I on the shaft J, which carries the needle N, and is held taut by the tension-spring K, mounted on the post $k$. The shaft J is supported in bearings $o$, carried by the post O, and this shaft is provided with a conducting-sector L, which moves between the poles of a permanent damping-magnet M. With the arrangement as described it will be seen that a very slight expansion of the wire B will result in a very considerable longitudinal movement of the cord H, and consequently a considerable angular movement of the needle N over the scale S. In order to obtain the desired proportion between the units in the several parts of the scale, I provide a pulley which is eccentrically mounted or is cam-shaped, as shown in Fig. 3. By properly shaping this pulley, as indicated, the relative proportion of the units on the different parts of the scale may be adjusted as desired. Since the sector L acts as a counterbalance for the needle N, it may be given a comparatively large radius without unnecessarily increasing the weight of the moving parts, and consequently efficient damping is obtained with a comparatively weak magnetic field, so that a fairly wide air-gap may be employed in the permanent magnet, which simplifies the construction of the instrument.

I do not desire to limit myself to the particular construction and arrangement of parts here shown, but aim in the appended claims to cover all modifications which are within the scope of my invention.

What I claim as new, and desire to secure by Letters Patent of the United States, is—

1. In an electrical measuring instrument, a yielding abutment comprising two parallel springs supported at one end and connected to each other at their free end, a wire adapted to be traversed by electric current stretched between said abutment and another support, and a compensating wire approximately parallel to the first wire connecting said abutment to a fixed support.

2. In an electrical measuring instrument, a yielding abutment comprising two parallel leaf-springs supported at one end and connected to each other at their free end, a wire adapted to be traversed by electric current stretched between said abutment and another support, and a compensating wire approximately parallel to the first wire and taking up the tension of said parallel springs.

3. In an electrical measuring instrument, a yielding abutment comprising two parallel springs supported at one end and connected to each other at their free end, a wire adapted to be traversed by electric current stretched at substantially right angles to said springs and attached to their free end, and a compensating wire substantially parallel to said first wire and connecting the free end of said springs to a fixed support.

4. In an electrical measuring instrument, a wire adapted to be traversed by electric currents, a compensating wire not traversed by current, and a heat-guard interposed between said wires.

5. In an electrical measuring instrument, a wire adapted to be traversed by electric currents, a compensating wire not traversed by current, and a plate of heat-absorbing, heat-conducting, material interposed between said wires.

6. In an electrical measuring instrument, an expansion-wire adapted to be traversed by electric currents, means for laterally straining said wire, means for indicating the amount said wire yields to said strain when expanded by an electric current, a compensating wire adapted to vary the distance between the end supports of the expansion-wire, and a heat-guard interposed between said wires.

7. In an electrical measuring instrument, indicating means, a cam-shaped pulley operatively connected thereto, a member movable with variation of current through the instrument, and a cord connected to said member and passing around said pulley.

8. In an electrical measuring instrument, an expansion-wire adapted to be traversed by electric current, indicating means, a cam-shaped pulley operatively connected to said means, and a cord operatively connected to said wire and passing around said pulley.

9. In an electrical measuring instrument, an expansion-wire adapted to be traversed by electric current, means for laterally straining said wire, indicating means, a cam-shaped pulley carried thereby, and a cord connected to said straining means and passing around said pulley.

In witness whereof I have hereunto set my hand this 8th day of October, 1904.

WESLEY E. LAIRD.

Witnesses:
SAMUEL E. WIDDIFIELD,
R. E. HAYNES.